US 11,732,606 B2

United States Patent
Segawa

(10) Patent No.: US 11,732,606 B2
(45) Date of Patent: Aug. 22, 2023

(54) COOLING STRUCTURE AND TURBOCHARGER

(71) Applicant: IHI Corporation, Tokyo (JP)

(72) Inventor: Kenichi Segawa, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 17/656,969

(22) Filed: Mar. 29, 2022

(65) Prior Publication Data
US 2022/0220864 A1   Jul. 14, 2022

Related U.S. Application Data

(63) Continuation of application No. PCT/JP2020/032067, filed on Aug. 25, 2020.

(30) Foreign Application Priority Data

Oct. 30, 2019   (JP) ................................. 2019-196986

(51) Int. Cl.
| | |
|---|---|
| F01D 25/14 | (2006.01) |
| F01D 25/12 | (2006.01) |
| F02C 6/12 | (2006.01) |

(52) U.S. Cl.
CPC .............. F01D 25/14 (2013.01); F01D 25/12 (2013.01); F02C 6/12 (2013.01)

(58) Field of Classification Search
CPC ........ F01D 25/12; F01D 25/125; F01D 25/14; F01D 25/145; F01D 5/046; F02C 6/12;
(Continued)

(56) References Cited

U.S. PATENT DOCUMENTS

| | | | | |
|---|---|---|---|---|
| 4,364,717 A | * | 12/1982 | Schippers | ........... F16C 33/1045 |
| | | | | 417/407 |
| 9,567,870 B2 | * | 2/2017 | Bogner | ..................... F02C 6/12 |
| 9,617,910 B2 | * | 4/2017 | Maeda | .................. F02B 39/005 |

(Continued)

FOREIGN PATENT DOCUMENTS

| | | |
|---|---|---|
| JP | 63-10231 U | 1/1988 |
| JP | 7-150962 A | 6/1995 |

(Continued)

OTHER PUBLICATIONS

Japanese Office Action dated Mar. 22, 2023 in Japanese Patent Application No. 2021-554108, citing documents 15-16 there in, 6 pages.

(Continued)

*Primary Examiner* — Igor Kershteyn
(74) *Attorney, Agent, or Firm* — Oblon, McClelland, Maier & Neustadt, L.L.P.

(57) ABSTRACT

A cooling structure includes: a housing including an inner cylindrical portion through which a shaft is inserted; a coolant flow path formed in the housing and opened on one side of the housing in a rotational axis direction, the coolant flow path being located radially outside the inner cylindrical portion; a lid member disposed in an opening of the coolant flow path, the lid member located radially outside the inner cylindrical portion and adjacent to the coolant flow path; a first end portion on the lid member, the first end portion contacting, in the radial direction, an inner circumferential surface of the coolant flow path on one side in the radial direction; and a second end portion on the lid member, the second end portion contacting, in the rotational axis direction, an abutment surface on the housing on the other side in the radial direction.

5 Claims, 5 Drawing Sheets

(58) Field of Classification Search
CPC ............... F02B 39/00; F05D 2220/40; F05D 2260/98; F05D 2300/50212
See application file for complete search history.

(56) References Cited

U.S. PATENT DOCUMENTS

| | | | |
|---|---|---|---|
| 10,072,667 B2 * | 9/2018 | An | F04D 25/024 |
| 11,199,201 B2 * | 12/2021 | Makino | F02B 39/00 |
| 2004/0200215 A1 * | 10/2004 | Woollenweber | F04D 29/059 60/407 |
| 2010/0266430 A1 * | 10/2010 | Shimizu | F02B 39/10 417/423.8 |
| 2013/0323021 A1 | 12/2013 | Bogner et al. | |
| 2015/0056065 A1 | 2/2015 | Takama et al. | |
| 2016/0003139 A1 | 1/2016 | Maeda et al. | |
| 2018/0216633 A1 | 8/2018 | Makino et al. | |

FOREIGN PATENT DOCUMENTS

| | | |
|---|---|---|
| JP | 2007-46570 A | 2/2007 |
| JP | 2008-223569 A | 9/2008 |
| JP | 2009-41443 A | 2/2009 |
| JP | 2013-209934 A | 10/2013 |
| JP | 2014-34957 A | 2/2014 |
| JP | 2016-17425 A | 2/2016 |
| JP | 2019-127860 A | 8/2019 |
| WO | WO 2017/145581 A1 | 8/2017 |

OTHER PUBLICATIONS

International Search Report dated Oct. 13, 2020 in PCT/JP2020/032067 filed Aug. 25, 2020, citing documents AA-AC and AP-AT therein, 6 pages (with English Translation).

* cited by examiner

COOLING STRUCTURE AND TURBOCHARGER

CROSS REFERENCE TO RELATED APPLICATIONS

This application is a continuation application of International Application No. PCT/JP2020/032067, filed on Aug. 25, 2020, which claims priority to Japanese Patent Application No. 2019-196986 filed on Oct. 30, 2019, the entire contents of which are incorporated herein by reference.

BACKGROUND ART

Technical Field

The present disclosure relates to a cooling structure and a turbocharger.

Conventionally, a turbocharger includes a turbine housing, a bearing housing, and a compressor housing. A turbine impeller is accommodated in the turbine housing. A compressor impeller is accommodated in the compressor housing. The turbine impeller and the compressor impeller are connected by a shaft. The bearing housing accommodates the shaft and a bearing. The bearing supports the shaft.

A coolant flow path and a lubricant flow path are formed in the bearing housing. Coolant flows through the coolant flow paths. The coolant cools the bearing housing. Lubricant flows through the lubricant flow path. The lubricant is supplied to the bearing through the lubricant flow path. The lubricant lubricates the bearing.

Patent Literature 1 discloses a split-type bearing housing. The split-type bearing housing is divided by a dividing plane orthogonal to the axial direction of the shaft in a space between the bearing and the turbine impeller. The split-type bearing housing includes a first bearing housing and a second bearing housing. The first bearing housing is disposed on a compressor impeller side. The second bearing housing is disposed on a turbine impeller side.

A first coolant flow path is formed in the first bearing housing. A second coolant flow path is formed in the second bearing housing. When the first bearing housing and the second bearing housing are connected to each other, the first coolant flow path and the second coolant flow path form a single coolant flow path.

In the space between the bearing and the turbine impeller, a shaft accommodation space is formed to accommodate the shaft. A first shaft accommodation space is formed in the first bearing housing. A second shaft accommodation space is formed in the second bearing housing. When the first bearing housing and the second bearing housing are connected to each other, the first shaft accommodation space and the second shaft accommodation space form a single shaft accommodation space.

CITATION LIST

Patent Literature

Patent Literature 1: JP H07-150962 A

SUMMARY

Technical Problem

However, a portion of the coolant flowing through the coolant flow paths may flow into the shaft accommodation space through the split surface. In the shaft accommodation space, the lubricant after lubricating the bearing is scattered. Therefore, there is a risk that the lubricant and the coolant are mixed in the shaft accommodation space.

An object of the present disclosure is to provide a cooling structure and a turbocharger that can reduce a mixture of a lubricant and a coolant.

Solution to Problem

In order to solve the above problem, a cooling structure according to one aspect of the present disclosure includes a housing including an inner cylindrical portion provided with an insertion hole through which a shaft is inserted; a coolant flow path formed radially outside the inner cylindrical portion in the housing; and a lid member disposed radially outside the inner cylindrical portion of the housing and adjacent to the coolant flow path.

The cooling structure may include: an inner end portion facing the housing in a radial direction and formed on an inner part of the lid member; an outer end portion facing the housing in the radial direction and formed on an outer part of the lid member; and an abutment surface formed in the housing and contacting either one of the inner end portion or the outer end portion in an axial direction of the shaft.

The cooling structure may include: an inner opposing surface of the housing, the inner opposing surface facing the inner end portion in the radial direction; an outer opposing surface of the housing, the outer opposing surface facing the outer end portion in the radial direction; and a sealing member disposed on either one of the inner opposing surface or the outer opposing surface.

The cooling structure may include a sealing member disposed on the abutment surface.

In order to solve the above problem, the turbocharger of the present disclosure includes the above cooling structure.

Effects of Disclosure

According to the present disclosure, it is possible to reduce a mixture of a lubricant and a coolant.

DESCRIPTION OF EMBODIMENTS

Embodiments of the present disclosure will be described in detail below with reference to the accompanying drawings. Specific dimensions, materials, and numerical values described in the embodiments are merely examples for a better understanding, and do not limit the present disclosure unless otherwise specified. In this specification and the drawings, duplicate explanations are omitted for elements having substantially the same functions and configurations by assigning the same sign. Furthermore, elements not directly related to the present disclosure are omitted from the figures.

Figure 1:
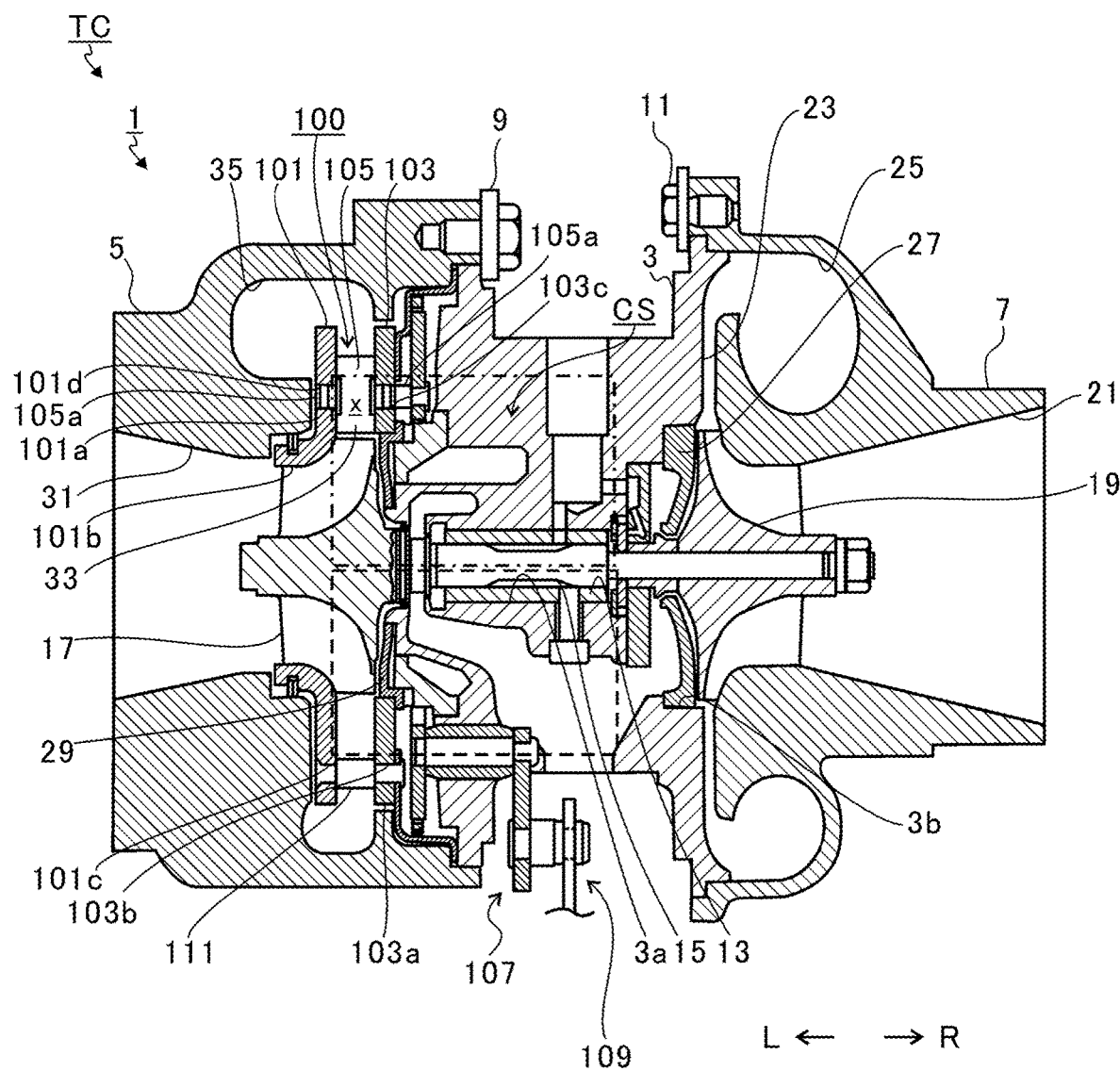
FIG. 1 is a schematic cross-sectional view of a turbocharger.

FIG. 1 is a schematic cross-sectional view of a turbocharger TC. A direction indicated by an arrow L in FIG. 1 is described as the left side of the turbocharger TC. A direction indicated by an arrow R in FIG. 1 is described as the right side of the turbocharger TC. As shown in FIG. 1, the turbocharger TC comprises a turbocharger body 1. The turbocharger body 1 includes a bearing housing 3, a turbine housing 5, and a compressor housing 7. The turbine housing 5 is connected to the left side of the bearing housing 3 by a fastening bolt 9. The compressor housing 7 is connected to the right side of the bearing housing 3 by a fastening bolt 11.

A bearing hole 3a is formed in the bearing housing 3. The bearing hole 3a passes through in the left-to-right direction of the turbocharger TC. A bearing 13 is arranged in the bearing hole 3a. In FIG. 1, a semi-floating bearing is shown as an example of the bearing 13. However, the bearing 13 may be any other radial bearing, such as a full-floating bearing or a rolling bearing. A shaft 15 is inserted into the bearing 13. The shaft 15 is rotatably supported by the bearing 13. A turbine impeller 17 is provided at the left end of the shaft 15. The turbine impeller 17 is rotatably accommodated in the turbine housing 5. A compressor impeller 19 is provided at the right end of the shaft 15. The compressor impeller 19 is rotatably accommodated in the compressor housing 7. The turbine impeller 17 and the compressor impeller 19 rotate integrally with the shaft 15.

An inlet 21 is formed in the compressor housing 7. The inlet 21 opens to the right side of the turbocharger TC. The inlet 21 is connected to an air cleaner (not shown). A diffuser flow path 23 is formed between the bearing housing 3 and the compressor housing 7. The diffuser flow path 23 pressurizes air. The diffuser flow path 23 is formed in an annular shape from an inner side to an outer side in a radial direction of the shaft 15 (compressor impeller 19) (hereinafter simply referred to as the radial direction). The diffuser flow path 23 is connected to the inlet 21 via the compressor impeller 19 at the radially inner part.

A compressor scroll flow path 25 is formed in the compressor housing 7. The compressor scroll flow path 25 is formed in an annular shape. The compressor scroll flow path 25 is, for example, located radially outside the compressor impeller 19. The compressor scroll flow path 25 is connected to an intake port of an engine (not shown) and to the diffuser flow path 23.

When the compressor impeller 19 rotates, air is sucked into the compressor housing 7 from the inlet 21. The intake air is pressurized and accelerated while passing through blades of the compressor impeller 19. The pressurized and accelerated air is pressurized in the diffuser flow path 23 and the compressor scroll flow path 25. The pressurized air is discharged from a discharge port (not shown) and is led to the intake port of the engine.

A sealing plate 27 is disposed on a rear side (the left side in FIG. 1) of the compressor impeller 19. The sealing plate 27 has a disk shape. An outer diameter of the sealing plate 27 is larger than the maximum outer diameter of the compressor impeller 19. However, the outer diameter of the sealing plate 27 may be equal to the maximum outer diameter of the compressor impeller 19, or may be smaller than the maximum outer diameter of the compressor impeller 19. A through hole is formed in the sealing plate 27 at the center of the radial direction. A shaft 15 is inserted into the through hole.

A fitting hole 3b is formed in the bearing housing 3 on a face closer to the compressor housing 7 (right side in FIG. 1). The sealing plate 27 is fitted into the fitting hole 3b. A bolt hole (not shown) is provided in the sealing plate 27 radially outward the through hole. The bolt hole penetrates in a rotational axis direction of the shaft 15 (hereinafter simply referred to as the axial direction). A threaded hole (not shown) is formed in the fitting hole 3b at a position facing the bolt hole in the axial direction. A fastening bolt (not shown) is inserted into the bolt hole. The fastening bolt is screwed into the threaded hole. The sealing plate 27 is fastened to the bearing housing 3 by the fastening bolt.

The bearing 13 accommodated in the bearing hole 3a of the bearing housing 3 is lubricated with a lubricant. The sealing plate 27 prevents the lubricant from leaking from the bearing housing 3 into the compressor housing 7 after lubricating the bearing 13. It prevents the lubricant from leaking from the bearing housing 3 to the compressor housing 7.

A heat shield 29 is disposed between the bearing housing 3 and the turbine housing 5. The heat shield 29 has a disk shape. An outer diameter of the heat shield 29 is larger than the maximum outer diameter of the turbine impeller 17. A through hole is formed in the heat shield 29 at the center of the radial direction. The shaft 15 is inserted into the through hole. The heat shield 29 is disposed at a position facing the turbine impeller 17 in the axial direction. The heat shield 29 is spaced apart from the turbine impeller 17 in the axial direction.

The heat shield 29 blocks radiated heat from the turbine impeller 17 to the bearing housing 3. In other words, the heat shield 29 curbs transmission of the heat from an exhaust gas to the bearing housing 3. The heat shield 29 curbs a temperature increase of the bearing 13 accommodated in the bearing hole 3a of the bearing housing 3. As a result, a function of the bearing 13 is maintained.

An outlet 31 is formed in the turbine housing 5. The outlet 31 opens to the left side of the turbocharger TC. The outlet 31 is connected to an exhaust gas purification device (not shown). A gap 33 is formed between the bearing housing 3 and the turbine housing 5. In the gap 33, a flow path x is formed where the exhaust gas passes through. The flow path x is formed in an annular shape from the inner side to the outer side in the radial direction of the shaft 15.

A turbine scroll flow path 35 is formed in the turbine housing 5. The turbine scroll flow path 35 is, for example, located radially outside the turbine impeller 17. The flow path x is located between the turbine impeller 17 and the turbine scroll flow path 35. The flow path x connects the turbine scroll flow path 35 with the outlet 31 via the turbine impeller 17.

The turbine scroll flow path 35 is connected to a gas inlet (not shown). The exhaust gas discharged from an exhaust manifold of the engine (not shown) is led to the gas inlet. The exhaust gas led from the gas inlet to the turbine scroll flow path 35 is led to the outlet 31 through the flow path x and blades of the turbine impeller 17. The exhaust gas led to the outlet 31 rotates the turbine impeller 17 while passing therethrough.

The rotational force of the turbine impeller 17 is transmitted to the compressor impeller 19 via the shaft 15. As described above, the air is pressurized by the rotational force of the compressor impeller 19 and is led to the intake port of the engine.

As the flow rate of the exhaust gas introduced into the turbine housing 5 decreases, a rotational rate of the turbine impeller 17 decreases. As the rotational rate of the turbine impeller 17 decreases, the rotational rate of the compressor impeller 19 also decreases. When the rotational rate of the compressor impeller 19 decreases, it may not be possible to sufficiently increase the pressure of the air supplied to the intake port of the engine.

Therefore, a variable capacity mechanism 100 is disposed in the gap 33 in the turbine housing 5. The variable capacity mechanism 100 comprises a shroud ring 101, a nozzle ring 103, nozzle vanes 105, a drive mechanism 107, and an actuator 109.

The shroud ring 101 is disposed in the gap 33 on a side spaced apart from the bearing housing 3. The shroud ring 101 includes a body portion 101a and a protruding portion 101b. The body portion 101a is formed in a thin plate ring shape. The protruding portion 101b protrudes from an inner circumferential edge of the body portion 101a toward the outlet 31.

Pin shaft holes 101c are formed in the body portion 101a. The pin shaft hole 101c penetrates the body portion 101a in the axial direction. The plurality of pin shaft holes 101c (only one is shown in FIG. 1) are formed at equal intervals in a circumferential direction of the body portion 101a. However, the plurality of pin shaft holes 101c may be formed at unequal intervals in the circumferential direction of the body portion 101a.

The nozzle ring 103 is disposed in the gap 33 on a side closer to the bearing housing 3. The nozzle ring 103 faces the shroud ring 101 in the axial direction. The nozzle ring 103 is spaced apart from the shroud ring 101 in the axial direction. The flow path x is formed between the shroud ring 101 and the nozzle ring 103.

The nozzle ring 103 includes a body portion 103a. The body portion 103a is formed in a thin plate ring shape. The body portion 103a of the nozzle ring 103 has a diameter (outer diameter) substantially equal to that of the body portion 101a of the shroud ring 101.

Pin shaft holes 103b are formed in the body portion 103a. The pin shaft hole 103b penetrates the body portion 103a in the axial direction. The plurality of pin shaft holes 103b (only one is shown in FIG. 1) are formed at equal intervals in the circumferential direction of the body portion 103a. However, the plurality of the pin shaft holes 103b may be formed at unequal intervals in the circumferential direction of the body portion 103a.

The pin shaft holes 103b are arranged so as to face the pin shaft holes 101c in the axial direction. A connecting pin 111 is inserted into the pin shaft holes 101c and 103b. The shroud ring 101 is connected to the nozzle ring 103 by the connecting pin 111. The connecting pin 111 maintains the shroud ring 101 and the nozzle ring 103 at a constant distance.

blade shaft holes 101d are formed in the body portion 101a of the shroud ring 101. The blade shaft holes 101d are disposed radially inside the pin shaft holes 101c in the body portion 101a. The blade shaft hole 101d penetrates the body portion 101a in the axial direction. The plurality of blade shaft holes 101d (only one is shown in FIG. 1) are formed at equal intervals in the circumferential direction of the body portion 101a.

Blade shaft holes 103c are formed in the body portion 103a of the nozzle ring 103. The blade shaft holes 103c are disposed radially inside the pin shaft holes 103b in the body portion 103a. The blade shaft hole 103c penetrates the body portion 103a in the axial direction. The plurality of blade shaft holes 103c (only one is shown in FIG. 1) are formed at equal intervals in the circumferential direction of the body portion 103a. The blade shaft holes 103c are disposed so as to face the blade shaft holes 101d in the axial direction.

A blade shaft 105a is integrally formed on the nozzle vane 105. The blade shaft 105a extends from the nozzle vane 105 in the axial direction. The blade shaft 105a is inserted into the blade shaft holes 101d and 103c. The blade shaft 105a is rotatably supported by the blade shaft holes 101d and 103c. The nozzle vane 105 is disposed between the body portions 101a and 103a with the blade shaft 105a being inserted into the blade shaft holes 101d and 103c. In other words, the nozzle vane 105 is disposed in the flow path x. The plurality of nozzle vanes 105 are arranged in the flow path x so as to being spaced apart from each other in the circumferential direction. The plurality of nozzle vanes 105 are arranged at equal intervals in a rotational direction (circumferential direction) of the turbine impeller 17. However, the plurality of nozzle vanes 105 may be arranged at unequal intervals in the rotational direction of the turbine impeller 17.

The drive mechanism 107 is connected to the actuator 109 and the blade shafts 105a. The actuator 109 is, for example, a pneumatic actuator. The drive mechanism 107 converts a linear motion of the actuator 109 into a rotational motion. The actuator 109 drives the drive mechanism 107 to rotate the blade shafts 105a.

When the blade shafts 105a rotate, the nozzle vanes 105 rotate integrally with the blade shafts 105a. As the nozzle vanes 105 rotate, the distance between the plurality of nozzle vanes 105 arranged in the flow path x changes. As the distance between the plurality of nozzle vanes 105 changes, a flow path cross-sectional area of the flow path x changes. As the flow path cross-sectional area of the flow path x changes, a flow velocity of the exhaust gas flowing through the flow path x changes.

The variable capacity mechanism 100 changes the distance (hereinafter referred to as an opening degree) between the plurality of nozzle vanes 105 in accordance with the flow rate of the exhaust gas. For example, when the flow rate of the exhaust gas is small, the variable capacity mechanism 100 reduces the opening degree of the nozzle vanes 105 to increase the velocity of the exhaust gas. As such, the variable capacity mechanism 100 can increase the rotational rate of the turbine impeller 17 even when the flow rate of the exhaust gas is small. As a result, the variable capacity mechanism 100 can increase the rotational rate of the compressor impeller 19 even when the flow rate of the exhaust gas is small.

Figure 2:
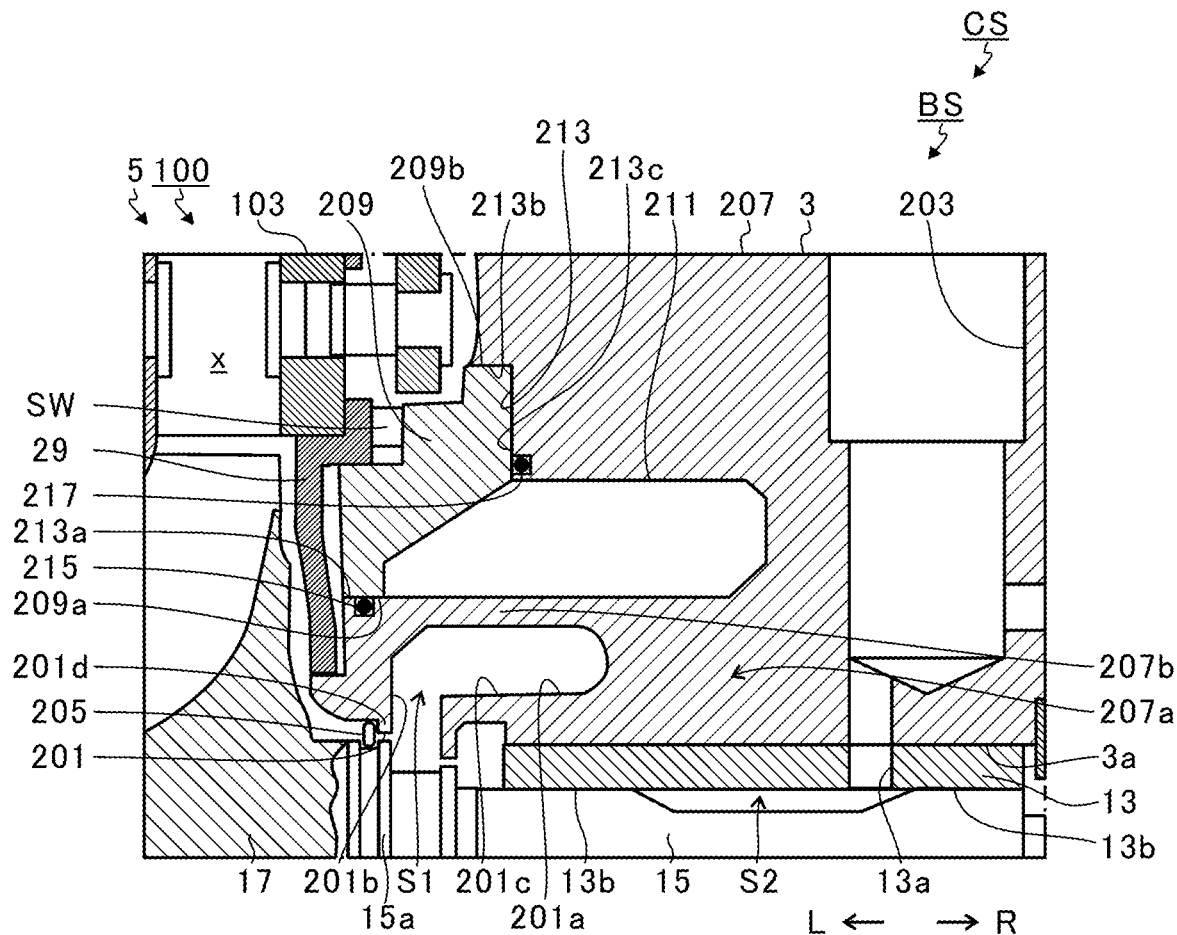
FIG. 2 is an extraction of an area enclosed by dashed dotted lines in FIG. 1.
Figure 3:
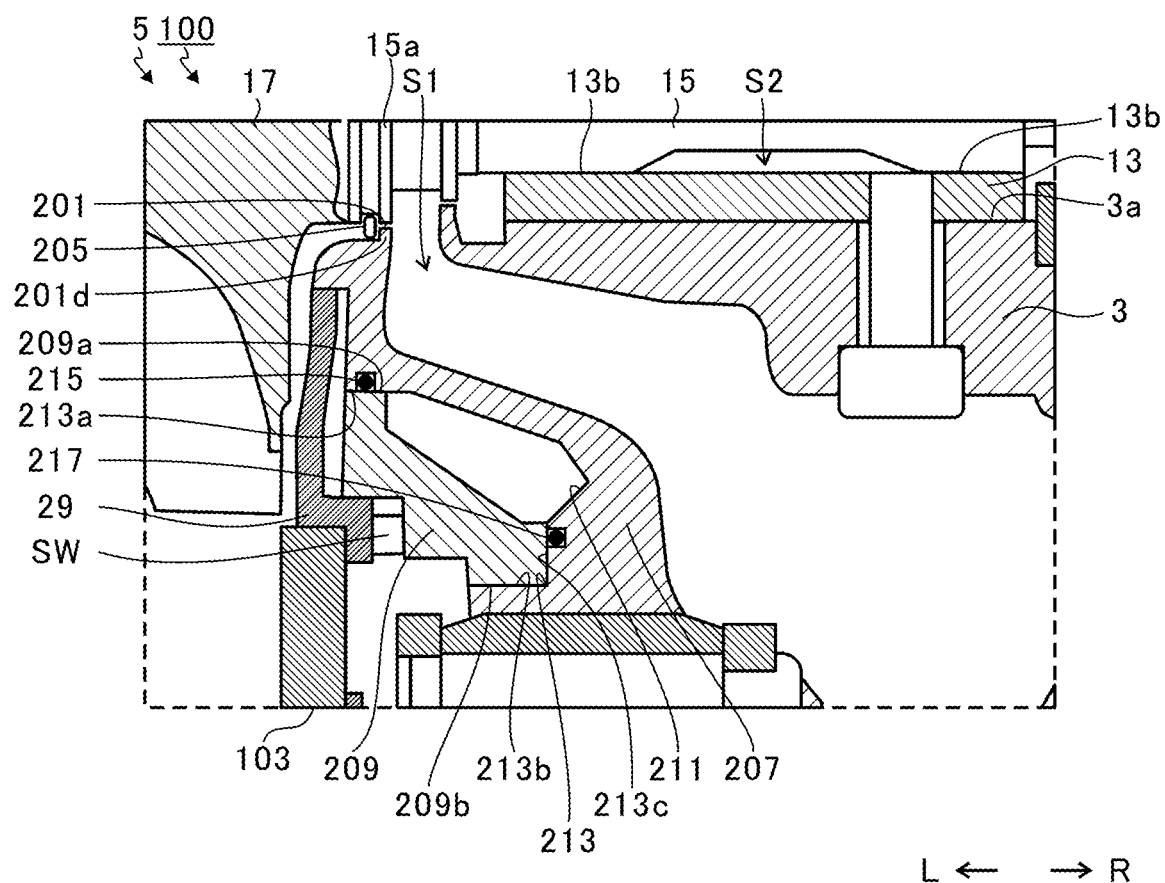
FIG. 3 is an extraction of an area enclosed by dashed lines in FIG. 1.

FIG. 2 is an extraction of an area enclosed by dashed dotted lines in FIG. 1. FIG. 3 is an extraction of an area enclosed by dashed lines in FIG. 1. As shown in FIGS. 2 and 3, the bearing housing 3 comprises a bearing structure BS. The bearing structure BS includes an insertion hole 201, a bearing 13, a lubricant flow path 203.

The insertion hole 201 penetrates the bearing housing 3 from the left end to the right end in FIG. 1. The shaft 15 is inserted into the insertion hole 201. The insertion hole 201 faces the shaft 15 in the radial direction. The bearing hole 3a is formed in the center of the insertion hole 201. The bearing hole 3a is a portion of the insertion hole 201 that faces the bearing 13 in the radial direction. The bearing 13 is accommodated in the bearing hole 3a.

A groove 201a is formed in the insertion hole 201. The groove 201a opens to the insertion hole 201. An opening of the groove 201a is formed closer to the turbine impeller 17 with respect to the bearing hole 3a. The opening of the groove 201a is formed between the bearing 13 and the turbine impeller 17.

The groove 201a includes a radially extending portion 201b and an axially extending portion 201c. The radially extending portion 201b faces the shaft 15 in the radial direction, and extends radially outward with respect to the shaft 15. The radially extending portion 201b extends over the circumferential direction of the shaft 15 and is formed in an annular shape. The axially extending portion 201c extends in the axial direction of the shaft 15 from an outer circumferential edge of the radially extending portion 201b. However, the groove 201a may only include the radially extending portion 201b. In other words, the groove 201a may not include the axially extending portion 201c. A scattering space S1 is formed inside the groove 201a. Details of the scattering space S1 will be described later.

Lubricant is supplied to the lubricant flow path 203. The lubricant flow path 203 opens (is connected) to the bearing hole 3a. The lubricant flow path 203 leads the lubricant to the bearing hole 3a. The lubricant flows from the lubricant flow path 203 into the bearing hole 3a.

A bearing 13 is disposed in the bearing hole 3a. The bearing 13 is formed in an annular shape. A through hole 13a is formed in the bearing 13. The through hole 13a extends in the radial direction from an inner circumferential surface to an outer circumferential surface of the bearing 13. The through hole 13a faces the lubricant flow path 203 in the radial direction. The lubricant flowing into the bearing hole 3a passes through the through hole 13a, and flows into a space S2 between the inner circumferential surface of the bearing 13 and the shaft 15.

The lubricant flowing into the space S2 moves in the axial direction (the left-to-right direction in FIGS. 2 and 3) of the shaft 15. In the bearing 13, a pair of bearing surfaces 13b, 13b are formed on both right and left sides of the space S2. The lubricant is supplied between the pair of bearing surfaces 13b, 13b and the shaft 15. The lubricant lubricates the pair of bearing surfaces 13b, 13b. The shaft 15 is supported by the oil film pressure of the lubricant. The pair of bearing surfaces 13b, 13b receive a radial load of the shaft 15.

The lubricant moves away from the space S2 in the axial direction of the shaft 15 after lubricating the pair of bearing surfaces 13b, 13b. A part of the lubricant moves from the bearings 13 toward the turbine impeller 17. During rotation of the shaft 15, a part of the lubricant is scattered in the radial direction of the shaft 15 as the shaft 15 rotates.

The lubricant scattered in the radial direction of the shaft 15 flows into the scattering space S1. The lubricant flowing into the scattering space S1 falls vertically downward while moving in the rotational direction of the shaft 15 in the scattering space S1 (groove 201a). The formation of the scattering space S1 reduces the amount of lubricant that moves toward the turbine impeller 17, compared to the case where the scattering space S1 is not formed.

A projection 201d protruding radially inward is formed in the insertion hole 201. The protrusion 201d is disposed closer to the turbine impeller 17 with respect to the scattering space S1. A large diameter portion 15a is formed in the shaft 15. In the shaft 15, the large diameter portion 15a is larger than a diameter of opposing portions that face the pair of bearing surfaces 13b, 13b. The large diameter portion 15a faces the projection 201d in the radial direction.

The amount of lubricant moving toward the turbine Impeller 17 is reduced by disposing the projection 201d and the large diameter portion 15a closer to the turbine impeller 17 with respect to the scattering space S1, compared to the case where the protrusion 201d and the large diameter portion 15a are not disposed.

A sealing ring 205 is disposed closer the turbine impeller 11 with respect to the projection 201d and the large diameter portion 15a. The sealing ring 205 is adjacent to the projection 201d and the large diameter portion 15a. The sealing ring 205 prevents the lubricant from leaking from a gap between the protrusion 201d and the large diameter portion 15a toward the turbine impeller 17. A cooling structure CS of the present embodiment will be described below with using FIGS. 2 and 3.

As shown in FIGS. 2 and 3, the bearing housing 3 includes the cooling structure CS. The cooling structure CS Includes a body (housing) 207 and a lid member 209. The body 207 constitutes a part of the bearing housing 3. The lid member 209 constitutes a part of the bearing housing 3. The body 207 and the lid member 209 constitute the bearing housing 3. The body 207 includes an inner cylindrical portion 207a in which the insertion hole 201 is formed. The groove 201a (the scattering space S1) is formed in the inner cylindrical portion 207a.

A coolant flow path 211 is formed in the body 207. The coolant flow path 211 is formed radially outside the inner cylindrical portion 207a. In other words, the inner cylindrical portion 207a is a part of the body 207 that is radially inside the coolant flow path 211. In the inner cylinder 207a, a partition wall 207b is formed between the coolant flow path 211 and the groove 201a. The coolant flow path 211 and the groove 201a are partitioned by the partition wall 207b. The coolant flow path 211 extends in the circumferential direction of the shaft 15. In the body 207, an opening 213 is formed closer to the turbine housing 5 with respect to the coolant flow path 211. The opening 213 opens to the outside the body 207. The opening 213 is continuous with the coolant flow path 211.

A coolant (cooling water) passes through the coolant flow path 211. The coolant cools the bearing housing (the body 207). The temperature of the bearing housing 3 is likely to be higher on a side closer to the turbine impeller 17 than on a side closer to the compressor impeller 19. Accordingly, the coolant flow path 211 is formed on the side closer to turbine impeller 17 in the body 207. Therefore, the coolant flow path 211 is formed on the turbine impeller 17 side of the body 207.

The lid member 209 is formed in an annular shape. The lid member 209 is disposed radially outside the inner cylindrical portion 207a. The lid member 209 is disposed in the opening 213. The lid member 209 closes the opening 213. In other words, the lid member 209 covers the opening 213.

In this embodiment, the lid member 209 is press-fitted into the opening 213. As such, the lid member 209 is joined to the body 207. However, the lid member 209 is not limited thereto, and may be fastened, welded, or glued to the body 207.

The lid member 209 is disposed adjacent to the coolant flow path 211 when press-fitted into the opening 213. The left side of the lid member 209 in FIG. 2 faces the external space (internal space of the turbine housing 5), and the right side of the lid member 209 in FIG. 2 faces the coolant flow path 211. In other words, the lid member 209 defines a part of the coolant flow path 211. Accordingly, the coolant flow path 211 is formed by the two members, i.e., the body 207 and the lid member 209.

The heat shield 29 is disposed on the left side of the lid member 209 in FIG. 2. The nozzle ring 103 is disposed on the left side of the heat shield 29 in FIG. 2. A spring washer SW is disposed between the lid member 209 and the heat shield 29. The spring washer SW is connected to the lid member 209 and the heat shield 29. The spring washer SW presses the heat shield 29 in a direction spaced apart from the lid member 209. This pressure causes the heat shield 29 to contact the nozzle ring 103. In other words, the heat shield 29 is pressed against the nozzle ring 103 by the spring washer SW. The heat shield 29 is held between the nozzle ring 103 and the lid member 209 by the spring washer SW.

The lid member 209 includes an inner end portion 209a and an outer end portion 209b. The inner end portion 209a is formed on an inner part of the lid member 209. The inner end portion 209a faces the body 207 in the radial direction. The outer end portion 209b is formed on an outer part of the lid member 209. The outer end portion 209b faces the body 207 in the radial direction.

The opening 213 has an inner opposing surface 213a, an outer opposing surface 213b, and an abutment surface 213c. The inner opposing surface 213a faces the inner end portion 213a of the lid member 209 in the radial direction. The outer opposing surface 213b faces the outer end portion 209b of the lid member 209 in the radial direction. The abutment surface 213c faces the outer end portion 209b in the axial direction, and contacts the outer end portion 209b. The abutment surface 213c contacts the outer end portion 209b to position the lid member 209 in the axial direction.

The inner opposing surface 213a has a substantially cylindrical shape. The inner opposing surface 213a is located at a position where an inner circumference surface on an inner part of the coolant flow path 211 is extended in the axial direction. For example, the inner opposing surface 213a is flush with the inner circumferential surface on the inner part of the coolant flow path 211. The abutment surface 213c has a substantially circular shape. The abutment surface 213c is located at a position where an inner circumferential surface on an outer part of the coolant flow path 211 is extended in a direction perpendicular to the axial direction. An inner end of the abutment surface 213c is continuous with the inner circumferential surface on the outer part of the coolant flow path 211. The outer opposing surface 213b has a substantially cylindrical shape. The outer opposing surface 213b is continuous with an outer end of the abutment surface 213c. The outer opposing surface 213b is located at a position extended from the outer end of the abutment surface 213c toward the turbine housing 5 in the axial direction.

The lid member 209 is composed of the same material as the body 207. That is, the lid member 209 is composed of a material having the same coefficient of linear expansion as that of the body 207. However, the lid member 209 may have a different coefficient of linear expansion from that of the body 207. For example, the lid member 209 may be composed of a material having a higher coefficient of linear expansion than that of the body 207. In such a case, when the temperature of the bearing housing 3 increases, the lid member 209 expands more than the body 207.

In this state, the outer opposing surface 213b is pressed radially outward by the outer end portion 209b. the outer end portion 209b. As such, the coolant passing through the coolant flow path 211 is less likely to leak from a gap between the outer opposing surface 213b and the outer end portion 209b.

In contrast, the inner end portion 209a moves (expands) in the direction spaced apart from the inner opposing surface 213a. As such, a sealing member 215 is disposed on the inner opposing surface 213a. The sealing member 215 is, for example, a sealing ring. The sealing member 215 is used to prevent the coolant from leaking from a gap between the inner opposing surface 213a and the inner end portion 209a toward the turbine housing 5.

In the present embodiment, a sealing member 217 is also disposed on the abutment surface 213c. The sealing member 217 is, for example, a sealing ring. The sealing member 217 is used to prevent the coolant from leaking from a gap between the abutment surface 213c and the outer end portion 2 toward the turbine housing 5. However, the sealing members 215 and 217 are not essential. For example, when the body 207 and the lid member 209 are composed of the same material, the sealing members 215 and 217 may not be disposed on the inner opposing surface 213a and the abutment surface 213c.

As described above, in the cooling structure CS of the present embodiment, the coolant flow path 211 is formed by two members, i.e., the main body 207 and the lid member 209. In other words, the coolant flow path 211 is formed by two divided members. Conventionally, a coolant flow path has been formed by a single member by casting.

Specifically, a coolant flow path has been formed by a single component by placing a sand mold (core) in a mold to cast a bearing housing. This conventional casting method has a limitation in making a thickness of the wall forming the coolant flow path thinner, and this limits a shape and a cross-sectional area of the coolant flow path.

Furthermore, the conventional casting method has the limitation in making the thickness of the wall forming the coolant flow path thinner, and it is difficult to position the coolant flow path closer to a sealing ring provided on a shaft. As a distance between the coolant flow path and the sealing ring increases, the sealing ring is less likely to be cooled. When the sealing ring is less likely to be cooled, the temperature of the sealing ring increases more than the heat resistant temperature, and this may lead to a degradation of the sealing ring and a decrease of a sealing performance.

Furthermore, if the coolant flow path has a complicated structure in the conventional casting method, it is difficult to remove the casting sand after the bearing housing is formed. In addition, if the coolant flow path has a complicated shape or if the thickness of the wall forming the coolant flow path is made thinner in the conventional casting method, an acceptable tolerance range is narrowed and a yield rate may decrease.

In contrast, in the cooling structure CS of the present embodiment, the coolant flow path 211 is formed by the body 207 and the lid member 209. Before the lid member 209 is attached to the body 207, the coolant flow path 211 is exposed to the outside of the body 207 through the opening 213. Accordingly, the coolant flow path 211 can be machined from the outside. Therefore, the cooling structure CS can reduce the restrictions on the shape and the cross-sectional area of the coolant flow path 211. The coolant flow path 211 may be formed by machining instead of casting. Furthermore, the coolant flow path 211 may be formed by casting (i.e., formed by placing a core in a mold), and then may be formed by machining.

In the cooling structure CS of the present embodiment, the coolant flow path 211 is formed by the body 207 and the lid member 209. This makes it easy, for example, to position the coolant flow path 211 closer to the sealing ring 205 provided on the shaft 15 by making the thickness of the lid member 209 thinner in the axial direction. Furthermore, this makes it easy to position the coolant flow path 211 closer to the sealing ring 205 by machining the coolant flow path 211 in the axial and radial directions. By positioning the coolant flow paths 211 closer to the sealing ring 205, it is possible to prevent the temperature of the sealing ring 205 from increasing higher than the heat resistant temperature.

In the cooling structure CS of the present embodiment, the coolant flow path 211 is exposed to the outside of the body 207 through the opening 213 before the lid member 209 is attached to the body 207. Accordingly, even when the bearing housing 3 is formed by casting, it is easy to remove the casting sand from the coolant flow path 211. Furthermore, the coolant flow path 211 can be formed by machining since it is exposed to the outside of the body 207 through the opening 213. Therefore, the cooling structure CS of the present embodiment can expand the tolerance range in casting, and thereby improving the yield rate.

In the cooling structure CS of the present embodiment, the lid member 209 adjacent to the coolant flow path 211 is disposed radially outside the inner cylindrical portion 207a of the body 207. Accordingly, the split surfaces (the joint surfaces) of the body 207 and the lid member 209 are not exposed to the insertion hole 201 (the groove 201a). In other words, the split surfaces (the joint surfaces) of the body 207 and the lid member 209 do not communicate with the insertion hole 201 (the groove 201a). If the split surfaces of the body 207 and the lid member 209 communicate with the insertion hole 201 (groove 201a), a part of the coolant passing through the coolant flow path 211 may flow into the scattering space S1 through the split surfaces. If the coolant flows into the scattering space S1, the lubricant in the scattering space S1 may be mixed with the coolant, and the lubricant may be diluted. If the lubricant is diluted, for example, it may cause an engine to fail when the turbocharger TC is mounted on a vehicle or a ship.

In contrast, when the lid member 209 adjacent to the coolant flow path 211 is arranged radially outside the inner cylinder 207a, the split surfaces of the two members do not connect the coolant flow path 211 with the scattering space S1. Accordingly, the coolant passing through the coolant flow path 211 does not flow into the scattering space S1 through the split surfaces of the two members. As a result, the cooling structure CS of this embodiment can prevent (reduce) the mixture of the coolant and the lubricant, the dilution of the lubricant, and the failure of the engine.

The cooling structure CS of the present embodiment comprises the abutment surface 213c that can contact the outer end portion 209b of the lid member 209 in the axial direction. As such, when the lid member 209 is press-fitted into the body 207, the abutment surface 213c can position the lid member 209 in the axial direction. However, the abutment surface 213c may contact with the inner end portion 209a of the lid member 209 in the axial direction.

Figure 4:
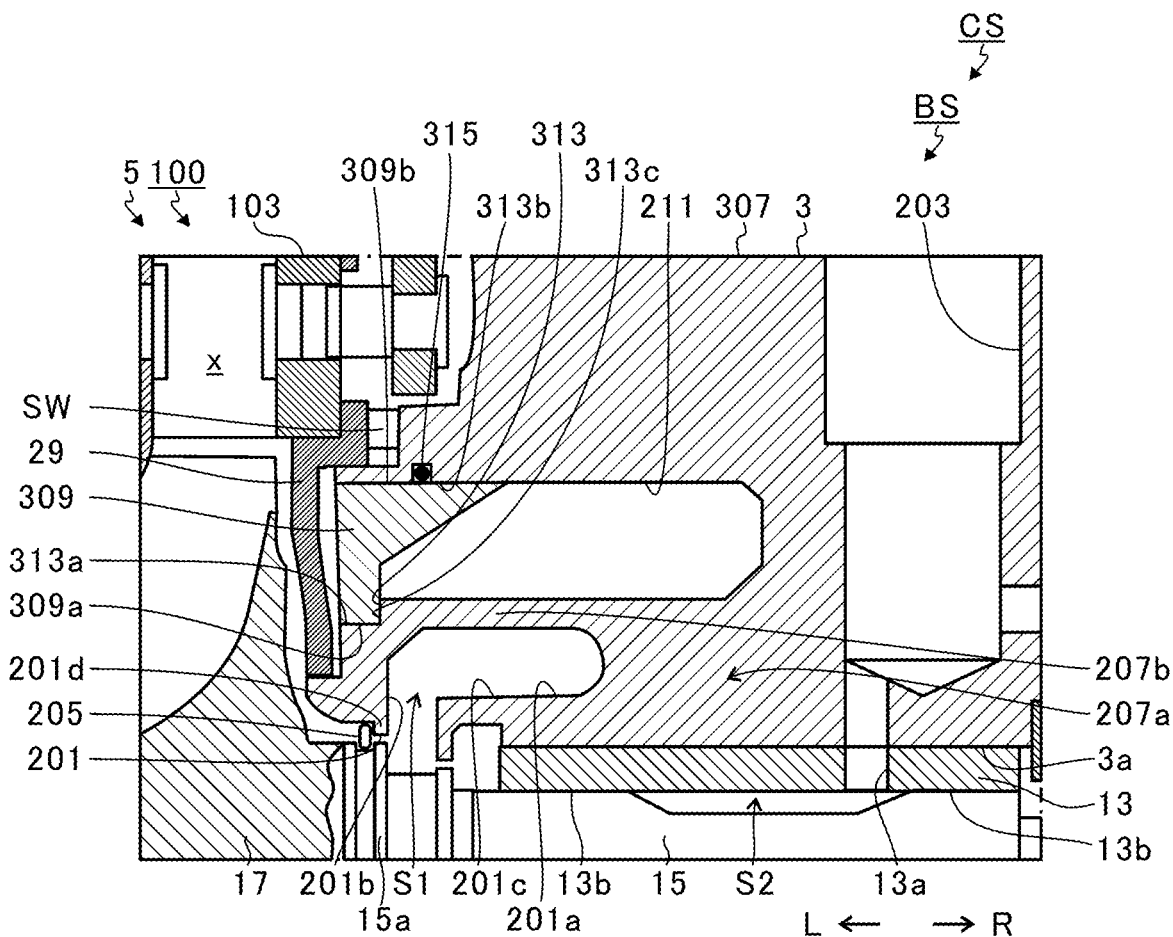
FIG. 4 shows a state in which a abutment surface contacts an inner end portion of a lid member.

FIG. 4 shows a state in which an abutment surface 313c contacts an inner end portion 309a of a lid member 309. As shown in FIG. 4, the coolant flow path 211 and an opening 313 are formed in the body 307. The lid member 309 is press-fitted into the opening 313.

The opening 313 includes an inner opposing surface 313a, an outer opposing surface 313b, and the abutment surface 313c. The inner opposing surface 313a faces the inner end portion 309a of the lid member 309 in the radial direction. The outer opposing surface 313b faces an outer end portion 309b of the lid member 309 in the radial direction. The abutment surface 313c faces the inner end portion 309a in the axial direction and contacts the inner end portion 309a. The abutment surface 313c can position the lid member 309 in the axial direction by contacting the inner end portion 309a. In this way, the abutment surface 213c, 313c may contact either one of the inner end portion 309a or the outer end portion 209b in the axial direction.

The outer opposing surface 313b has a substantially cylindrical shape. The outer opposing surface 313b is located at a position where an inner circumferential surface on an outer part of the coolant flow path 211 is extended in the axial direction. For example, the outer opposing surface 313b is flush with the inner circumferential surface on the outer part of the coolant flow path 211. The abutment surface 313c has a substantially circular shape. The abutment surface 313c is located at a position where the inner circumferential surface on the inner part of the coolant flow path 211 is extended in a direction perpendicular to the axial direction. An outer end of the abutment surface 313c is continuous with the inner circumferential surface on the inner part of the coolant flow path 211. The inner opposing surface 313a has a substantially cylindrical shape. The inner opposing surface 313a is continuous with an inner end of the abutment surface 313c. The inner opposing surface 313a is located at a position extended from the inner end of the abutment surface 313c toward the turbine housing 5 in the axial direction.

If the lid member 309 is made of a material having a smaller coefficient of linear expansion than that of the body 307, the body 307 expands greater than the lid member 309 as the temperature of the bearing housing 3 increases.

In this state, the inner end portion 309a is pressed radially outward by the inner opposing surface 313a. Accordingly, the coolant passing through the coolant flow path 211 is less likely to leak from a gap between the inner opposing surface 313a and the inner end portion 309a.

In contrast, the outer opposing surface 313b moves in a direction spaced apart from the outer end portion 309b. As such, a sealing member 315 is disposed on the outer opposing surface 313b. The sealing member 315 is, for example, a sealing ring. The sealing member 315 is used to prevent the coolant from leaking from a gap between the outer opposing surface 313b and the outer end portion 309b toward the turbine housing 5. In this manner, the sealing member 215, 315 may be provided on either one of the inner opposing surface 213a or the outer opposing surface 313b. As such, it is possible to prevent the coolant from leaking from the coolant flow path 211 toward the turbine housing 5, even when the materials of the body 207, 307 and the lid member 209, 309 are different from each other.

The sealing members 215 and 315 are not limited to a sealing ring. The sealing members 215 and 315 may be, for example, a liquid gasket.

Figure 5:
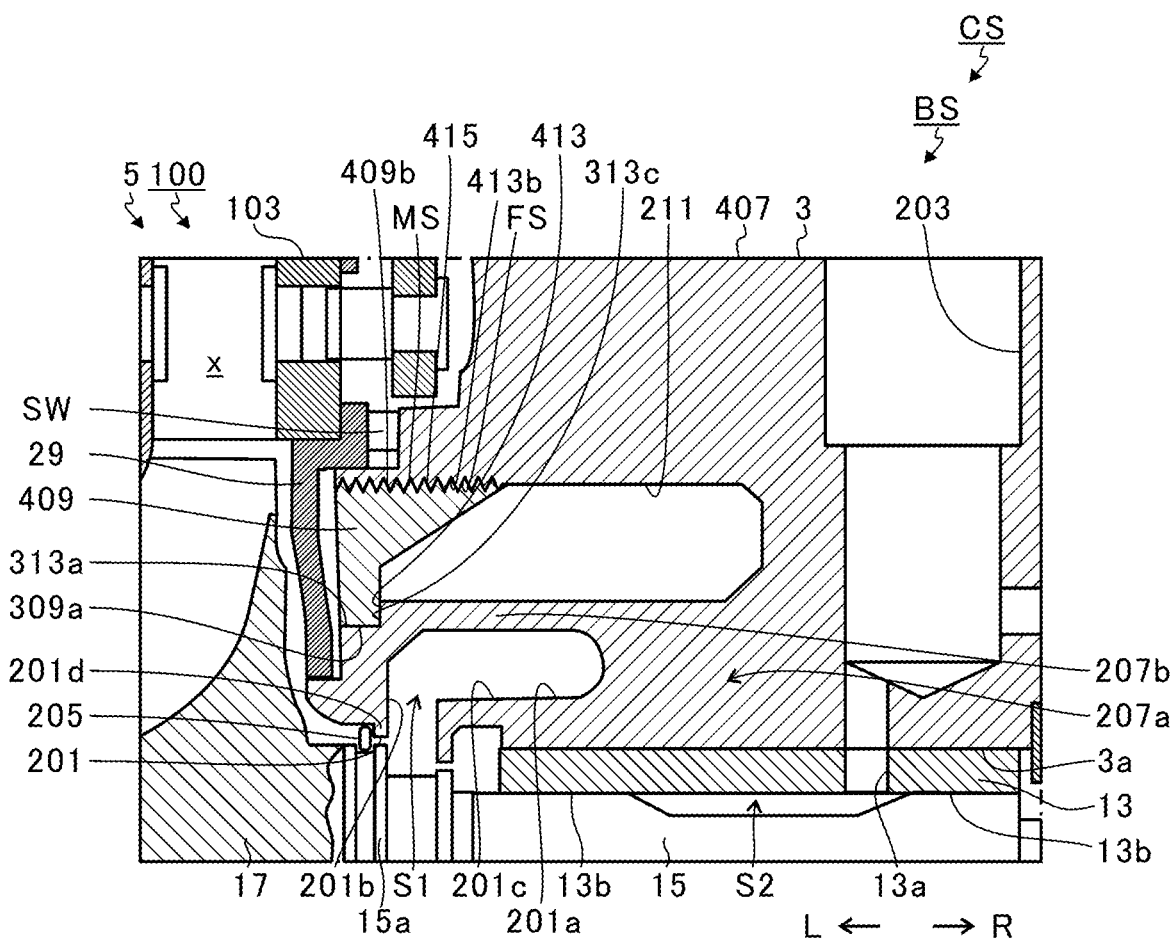
FIG. 5 shows a state in which a sealing member is disposed on an outer opposing surface.

FIG. 5 shows a state in which a sealing member 415 is disposed on an outer opposing surface 413b. As shown in FIG. 5, the coolant flow path 211 and an opening 413 are formed in a body 407. A lid member 409 is screwed to the opening 413.

The opening 413 includes the inner opposing surface 313a, an outer opposing surface 413b, and the abutment surface 313c. The inner opposing surface 313a faces the inner end portion 309a of the lid member 409 in the radial direction. The outer opposing surface 413b faces an outer end portion 409b of the lid member 409 in the radial direction. The abutment surface 313c faces the inner end portion 309a in the axial direction, and contacts the inner end portion 309a.

As shown in FIG. 5, the outer opposing surface 413b is provided with a female threaded portion FS threaded on an inner circumference surface. The outer end portion 409b is provided with a male threaded portion MS threaded on the outer circumference surface. The lid member 409 and the body 407 are screwed together by rotating the lid member 409 with respect to the body 407 with the female screw portion FS and the male screw portion MS being engaged. This makes it easier to assemble the bearing housing 3 (lid member 409 and body 407), compared to the case where the lid member 209 and body 207 are press-fitted together.

A sealing member 415 is disposed between the female threaded portion FS and the male threaded portion MS. The sealing member 315 is, for example, a liquid gasket. The sealing member 415 prevents the coolant from leaking from a gap between the female threaded portion FS and the male threaded portion MS toward the turbine housing 5.

As described above, in the cooling structure CS of this embodiment, the sealing member 217 is disposed on the abutment surface 213*c* (see FIGS. 2 and 3). As such, the sealing member 217 prevents the coolant from leaking from a gap between the abutment surface 213*c* and the outer end portion 209*b* toward the turbine housing 5.

Although the embodiments of the present disclosure have been described above with reference to the accompanying drawings, the present disclosure is not limited thereto. It is obvious that a person skilled in the art can conceive of various examples of variations or modifications within the scope of the claims, which are also understood to belong to the technical scope of the present disclosure.

In the above embodiment, the abutment surface 213*c*, 313*c* is formed on the body 207, 307, 407. However, the present disclosure is not limited thereto, and the body 207, 307, 407 may not include the abutment surface 213*c*, 313*c*. Furthermore, in the above embodiment, the sealing member 215, 315, 415 is disposed on the inner opposing surface 213*a*, 313*a* or on the outer opposing surface 213*b*, 313*b*, 413*b*. However, the present disclosure is not limited, and the sealing members 215, 315, 415 may not be disposed on the inner opposing surface 213*a*, 313*a* or on the outer opposing surface 213*b*, 313*b*, 413*b*. In addition, in the above embodiment, the sealing member 217 is disposed on the abutment surface 213*c*, 313*c*. However, the present disclosure is not limited thereto, and a sealing member 217 may not be disposed on the abutment surface 213*c*, 313*c*. For example, the lid member 209, 309, 409 may be welded to the body 207, 307, 407.

What is claimed is:

1. A cooling structure comprising:
    a housing including an inner cylindrical portion provided with an insertion hole through which a shaft is inserted;
    a coolant flow path formed in the housing and opened on one side of the housing in a rotational axis direction of the shaft, the coolant flow path being located radially outside the inner cylindrical portion;
    a lid member disposed in an opening of the coolant flow path, the lid member located radially outside the inner cylindrical portion and adjacent to the coolant flow path;
    a first end portion on the lid member, the first end portion contacting, in the radial direction, an inner circumferential surface of the coolant flow path on one side in the radial direction; and
    a second end portion on the lid member, the second end portion contacting, in the rotational axis direction, an abutment surface on the housing on the other side in the radial direction.

2. The cooling structure according to claim 1, wherein a coefficient of linear expansion of the lid member is different from a coefficient of linear expansion of the housing.

3. The cooling structure according to claim 2,
    wherein the coefficient of linear expansion of the lid member is larger than the coefficient of linear expansion of the housing,
    the first end portion contacts an inner circumferential surface on an inner part in the radial direction of the coolant flow path, and
    a sealing member is disposed on an inner opposing surface of the coolant flow path, the inner opposing surface contacting the first end portion in the radial direction.

4. The cooling structure according to claim 2,
    wherein the coefficient of linear expansion of the lid member is smaller than the coefficient of linear expansion of the housing,
    the first end portion contacts an inner circumferential surface on an outer part in the radial direction of the coolant flow path, and
    a sealing member is disposed on an outer opposing surface of the coolant flow path, the outer opposing surface contacting the first end portion in the radial direction.

5. A turbocharger comprising a cooling structure according to claim 1.

* * * * *